H. J. WIDMAIER.
CLUTCH.
APPLICATION FILED OCT. 5, 1920.
1,425,156.
Patented Aug. 8, 1922.
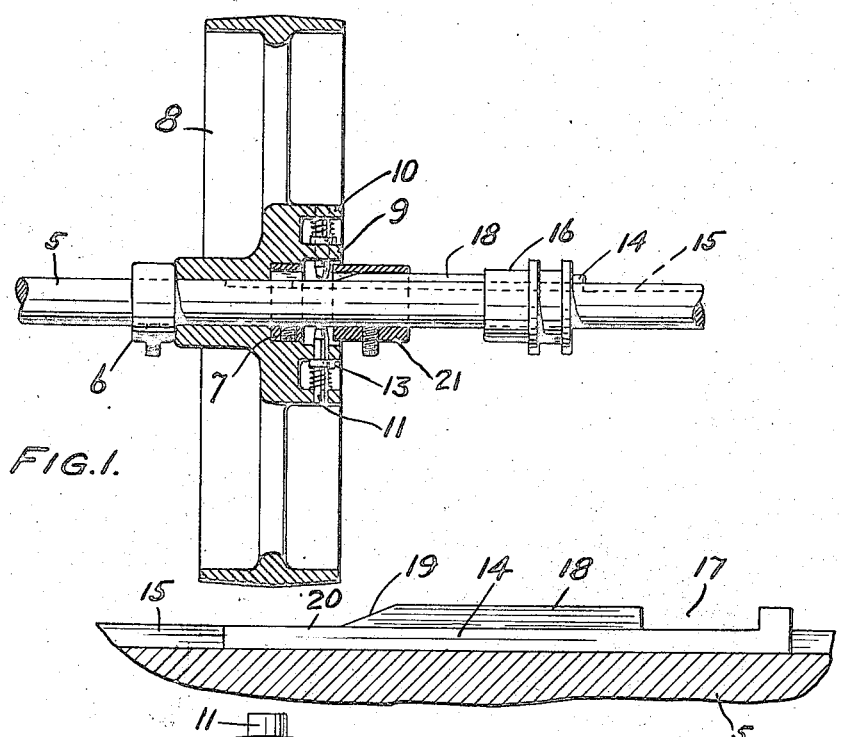
FIG.1.
FIG.3.
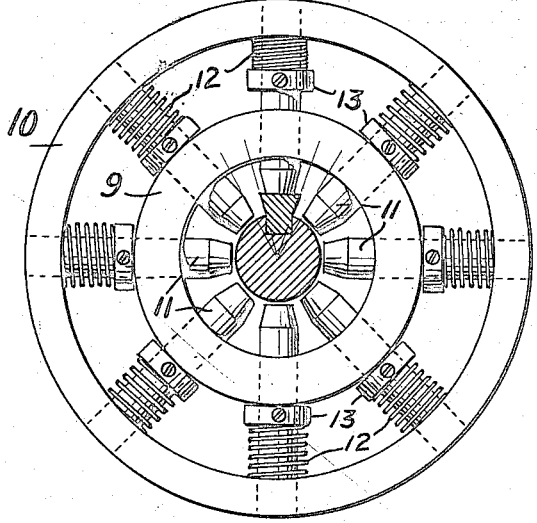
FIG.2.
WITNESS:
INVENTOR
Harry J. Widmaier
BY
ATTORNEY.

UNITED STATES PATENT OFFICE.

HARRY J. WIDMAIER, OF PHILADELPHIA, PENNSYLVANIA.

CLUTCH.

1,425,156.  Specification of Letters Patent.  Patented Aug. 8, 1922.

Application filed October 5, 1920. Serial No. 414,776.

*To all whom it may concern:*

Be it known that I, HARRY J. WIDMAIER, a citizen of the United States, residing at Philadelphia, county of Philadelphia, and State of Pennsylvania, have invented a new and useful Improvement in Clutches, of which the following is a full, clear, and exact description, reference being had to the accompanying drawings, which form a part of this specification.

This invention relates to clutches of the positive type, and is designed to provide a simple clutch of this type which is arranged to drive in either direction and which can be connected and disconnected when the driving member is rotated.

Fig. 1 is a longitudinal section through one form of clutch, made in accordance with my invention.

Fig. 2 is a face view of the clutch with the shaft and spline in section.

Fig. 3 is a detail sectional view of the shaft, on a larger scale, showing the spline in position in its seat.

In these drawings, 5 designates the shaft to be driven, and which in turn drives other shafts or a machine through the medium of suitable driving connections. Mounted on the shaft 5 between collars 6 and 7 is a pulley 8 which is adapted to be continuously driven from a suitable source of power, and which is arranged to be connected to the shaft, as hereinafter described. The collars 6 and 7 are secured to the shaft 5 and retain the pulley 8 against longitudinal movement along the shaft.

Mounted for radial movement in openings in annular flanges 9 and 10 formed integrally with the hub of the pulley 8 are a plurality of pins 11. These pins 11 are held in their inward position by springs 12 which engage collars 13 on the pins 11 and the flange 10. The collars 13 may be secured to the pins 11 by means of screws or tapered through pins, but are so positioned that when the pins are in their inward position the inner ends of the pins 11 will just clear the shaft 5. These pins 11 are arranged to connect the pulley 8 in driving relation with the shaft 5, through the medium of a spline 14, which is slidably mounted in a key way 15 in the shaft 5. The spline 14 is adapted to be moved along the shaft in the key way by a collar 16 seated in a recess 17 in the end of the spline 14. The collar 16 is provided with an annular groove for the reception of a forked lever or member, not shown, for shifting the collar and spline, when the pulley 8 is to be connected to or disconnected from the shaft 5.

The spline is provided with a driving portion 18, the sides of which are radial, and are arranged to be engaged by the ends of the pins 11, which are also tapered so as to form a line engagement with the driving portions of the spline, see Figure 2. One end of the driving portion is tapered as indicated at 19, while the portion 20 is of arcuate form, to form a continuous surface under the pins 11, when the spline is withdrawn to disconnect the pulley 8.

21 is a collar secured to the shaft 5 and is provided with a slot through which the driving portion of the spline is adapted to slide. The collar 7 is also slotted for the reception of the spline and when the parts are in driving connection, the collars 7 and 21 reinforce the spline against the shearing stresses of the pins 11 when so connected.

In Fig. 1 the spline is retracted and the pulley is free to rotate on the shaft 5. When it is desired to connect the shaft 5 to the pulley, which may be continuously driven in either direction, the collar 16 is shifted to the left by the shifting lever (not shown) a sufficient distance to carry the beveled or tapered portion 19 into the slot in the collar 7, and during its movement it will raise one of pins 11, as shown in Fig. 2, and the next pin will engage the flaring driving portion on the side of the spline 18 and rotate the shaft.

In the structure shown there is a certain amount of lost motion between the pins 11 and the spline, but if desired, the spline can be arranged to fill the space between alternate pins by increasing the number of pins or by increasing the width of the spline.

Having now fully described my invention, what I claim and desire to protect by Letters Patent is:—

1. A clutch element having a plurality of radially disposed spring-pressed pins, a driven shaft, a fixed member on each side of said pins secured to the shaft, there being a groove between said members in which said pins are adapted to travel when the clutch is disengaged, and a movable member arranged to be moved across said groove into driving engagement with said pins and both fixed members.

2. A clutch comprising a driving and a driven member, one of said members having a plurality of spring-pressed radial pins, and a sliding spline on the other member arranged to be shifted into driving engagement between two pins and under a pin between said two pins.

3. A clutch comprising a driving and a driven member, one of said members having a plurality of spring-pressed radial pins, and a sliding spline on the other member arranged to be shifted into driving engagement between two pins and under a pin between said two pins, said spline having a tapered portion arranged to raise said last mentioned pin when the spline is shifted into driving relation.

4. The combination with a shaft having a pulley loosely mounted thereon, collars on the shaft for retaining the pulley against endwise movement, spring-pressed radial pins in the pulley, of a spline slidably mounted in a key slot in the shaft arranged to be shifted into driving connection between two of said pins and under a pin between said two pins, said spline having a wedge-shaped portion for raising said last mentioned pin and means for shifting said spline.

5. The combination with a shaft having a pulley loosely mounted thereon, collars on the shaft for retaining the pulley against endwise movement, spring-pressed radial pins in the pulley, of a spline slidably mounted in a key slot in the shaft arranged to be shifted into driving connection between two of said pins and under a pin between said two pins, said spline having a wedge-shaped portion for raising said last mentioned pin and a grooved collar slidably mounted on the shaft for shifting the spline.

6. The combination with a shaft having a pulley loosely mounted thereon, collars on the shaft for retaining the pulley against endwise movement, spring-pressed radial pins in the pulley, of a spline slidably mounted in a key slot in the shaft arranged to be shifted into driving connection between two of said pins and under a pin between said two pins, means on the shaft for restraining the spline against the shearing stresses of the pins, said spline having a wedge-shaped portion for raising said last mentioned pin and means for shifting said spline.

7. The combination with a pulley and a shaft to be connected thereto and disconnected therefrom, of a collar secured to the shaft to prevent endwise movement in one direction of the pulley along the shaft, a second collar secured to the shaft on the other side of the pulley to prevent endwise movement of the pulley along the shaft in the other direction, a third collar secured to the shaft, there being a space between the second and third collars, a spring-pressed pin on the pulley extending into the space between said last mentioned collar, there being a spline seat in the shaft and in the two last mentioned collars, a spline in said seat arranged to be moved across the space between the collars into the path of the pin and to be withdrawn therefrom, and means for shifting the spline.

In testimony of which invention, I have hereunto set my hand, at Philadelphia, Pa., on this 2nd day of October, 1920.

HARRY J. WIDMAIER.